United States Patent Office 3,438,975
Patented Apr. 15, 1969

3,438,975
15α,16α-METHYLENE PREGNANES AND
19-NOR-PREGNANES
John A. Edwards, Los Altos, Calif., assignor to Syntex
Corporation, Panama, Panama, a corporation of
Panama
No Drawing. Filed July 1, 1966, Ser. No. 562,080
Int. Cl. C07c 169/34, 169/32, 173/00
U.S. Cl. 260—239.55   23 Claims

ABSTRACT OF THE DISCLOSURE

15α,16α-methylene-17α-hydroxypregn-4-enes and 19-norpregn-4-enes and 17α-ethers and esters thereof; optionally substituted at positions C–1, 2, C–3, C–6, C–16β and/or C–20; and/or optionally unsaturated at positions C–1, 2 and/or C–6, 7; are progestational agents.

---

This invention pertains to novel steroids and a process for their manufacture, in particular to pregnanes and 19-nor-pregnanes having a cyclopropyl ring fused to the 15 and 16 positions of the molecule.

The invention is specifically directed to compounds which may be represented by the formula:

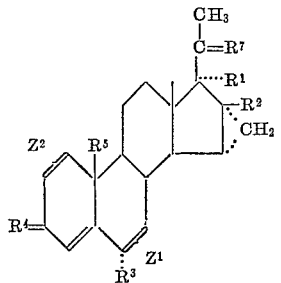

wherein:

$Z^1$ is a carbon-carbon single bond or a carbon-carbon double bond;

$Z^2$ is a carbon-carbon single bond, a carbon-carbon double bond, or a methylene group bridging the 1α and 2α positions of the structure:

in which X is hydrogen, chloro, or fluoro:

$R^1$ is hydroxy, a hydrocarbon carboxylic acyloxy group of less than 12 carbon atoms, tetrahydrofuran-2-yloxy, or tetrahydropryan-2-yloxy;

each of $R^2$, $R^5$ is hydrogen or methyl, $R^5$ being methyl when $Z^2$ is a carbon-carbon double bond;

$R^3$ is hydrogen, methyl, chloro, or fluoro, $R^3$ being α when $Z^1$ is a carbon-carbon single bond;

$R^4$ is keto-oxygen or the group

where:

$R^6$ is hydrogen, hydroxy, a hydrocarbon carboxylic acyloxy group of less than 12 carbon atoms, tetrahydrofuran-2-yloxy, or tetrahydropyran-2-yloxy.

$R^7$ is keto oxygen or the group

The hydrocarbon carboxylic acyloxy groups of the present invention contain less than 12 carbon atoms and may be normal, branched, cyclic or aliphatic-cyclic chains which may be saturated, unsaturated, or aromatic and may be optionally substituted by functional groups such as hydroxy, carbonyl, acyloxy containing up to 12 carbon atoms, alkoxy containing up to 5 carbon atoms, nitro, amino, hydroxy, halogeno, and the like. Typical esters thus include acetate, propionate, butyrate, valerate, caproate, enanthate, benzoate, hexahydrobenzoate, phenoxyacetate, t-butylacetate, trimethylacetate, cyclopentylpropionate, B-chloropropionate, dichloroacetate, aminoacetate, adamantoate, and the like.

The compounds of the present invention demonstrate hormonal properties characteristic of progestational agents, and thus are useful in the treatment of menstrual disorders and in the control of fertility. These compounds may be administered in the usual pharmaceutical compositions: as a solid form in pills, capsules, pellets, powders, and the like; and as a liquid form in solutions, syrups, suspensions, and the like.

The preparation of these 15α, 16α-methylenepregnanes and 19-norpregnanes may be represented as follows:

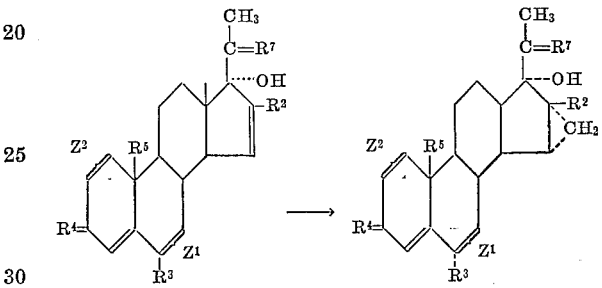

wherein $R^2$, $R^3$, $R^5$, $Z^1$, $R^7$, and $Z^2$ are the same as described hereinbefore, and $R^4$ is keto oxygen or the group

where $R^{6'}$ is hydrogen, hydrocarbon carboxylic acyloxy group of less than 12 carbon atoms, tetrahydrofuran-2-yloxy or tetrahydropyran-2-yloxy.

The 15α,16α-methylene steroids are prepared by treating 16-methyl-17α-hydroxy-Δ¹⁵-ene pregnanes or 19-nor-pregnanes with an iodomethyl metal iodine reagent. The reagent is prepared, either in situ or separately from the steroid, by treating methylene iodide ($CH_2I_2$) with an equal molar amount of a metal having an oxidation potential approximately between +0.25 volt and +1.18 volts, and preferably above +0.73 volt, e.g., zinc and chromium. The methylene iodide and the metal are allowed to react in an inert, anhydrous organic solvent such as diethyl ether, n-butyl ether, dioxane, tetrahydrofuran, diglyme, and the like. At least three times much solvent by volume is used than methylene iodide. The mixture is maintained at temperatures ranging from room temperature and below to about 100° C., preferably between 20° C. and 60° C., for a period of time ranging from about 30 minutes to about 48 hours. Unequal molar amounts of methylene iodide and metal or metal couple can be used, but the yield of the reagent will be based on the amount of the limiting component. Since equal molar amounts of methylene iodide and metal are utilized to form an equal molar amount of the reagent, the metal reagent can be coupled with other metals having oxidation potentials of between about −0.3 volt and −1.7 volts, such as copper, mercury or silver (see Chemical Rubber Publishing Company Handbook of Chemistry & Physics, 37th edition, 1955–1956, "Table of Oxidation Potentials," page 1633). The ratio of the reagent metal to the other metal in the couple can vary, but a ratio of between 80:20 to about 99:1 by weight is preferred. Some suitable metal couples include zinc:silver, chromium:copper, chromium:silver, and the like. The zinc copper metal couple is preferred.

The couples can be made by conventional techniques.

For example, a zinc:copper couple can be prepared by heating, under a hydrogen-nitrogen atmosphere a mixture composed of 100 gm. of powdered cupric oxide and 800 gm. of powdered zinc to 500° C. during a 4 hour period and maintaining this temperature for an additional 30 minutes. A zinc:copper couple is formed and is composed of 90% zinc and 10% copper by weight.

The steroid is treated with at least one-molar equivalent of the iodo-methyl metal iodine reagent, and preferable an excess of 10 molar or more; but smaller excesses can be used if desired. The ultimate molar:molar ratio of steroid to reagent will depend upon various factors, such as the particular steroid used, the particular solvent used, the reaction temperature, the reaction pressure and so forth. The process is carried out in an inert, anhydrous, organic solvent, using at least three times the volume of solvent as methylene iodide. The mixture is maintained at temperature ranging from room temperature and below to about 100° C., preferably from about 20° C. to 60° C., either at atmospheric pressure or at elevated pressures ranging from above 1 atmosphere to about 10 or more atmospheres or more for a period of time between 30 minutes and 48 hours. The reaction is carried out under dry conditions, and preferably the mixture is stirred during the reaction period.

Side reactions are minimized in this process by distilling or evaporating off about one-tenth to about one-half of the solvent during the course of the reaction. This step removes the alkyl iodides, such as methyl iodide, formed during the reaction whose presence affects the final yield. Thus by practicing the process of the present invention on $17\alpha$-hydroxy $\Delta^{15}$-en-steroids the corresponding steroids having a methylene group bridging the $15\alpha$ and $16\alpha$ position carbon atoms and which has the cis stereochemistry with respect to the $17\alpha$-hydroxy group is produced.

After the principal process of the present invention is complete the $17\alpha$-hydroxy compounds of the present invention can be esterified in a conventional manner. For example, the $17\alpha$-hydroxy steroid is allowed to react with an acyl simple anhydride, such as acetic anhydride, caproic anhydride, or an acyl halide, such as acetyl chloride or propionyl chloride, in the presence of a Lewis acid, such as toluenesulfonic acid, to produce the $17\alpha$-acyloxy derivative, such as acetoxy, propionoxy, caproxy, and so forth.

The 20-keto steroid derivatives of the present invention can be produced by treating the corresponding 20-hydroxy steroid with chromic trioxide in pyridine at room temperature.

The $3\beta$-hydroxy derivatives of the steroids of the above series can be produced by treating the corresponding 3-keto steroid with sodium borohydride in anhydrous isopropanol. The 3-hydroxy steroids thus obtained can be esterified in a conventional manner. For example, by treating the 3-hydroxy steroid with acetic anhydride in pryidine the 3-acetoxy is produced. By using other acyl anhydrides, the corresponding 3-acyloxy steroids are produced. By treating the 3-hydroxy steroids of the above series with dihydrofuran or dihydropyran in the presence of p-toluenesulfonyl chloride, the 3-tetrahydrofuran-2-yloxy or 3-tetrahydropyran-2-yloxy steroid is respectively formed.

The 3-keto group can be removed from the steroids of the above series by allowing the 3-keto steroids to react with ethane dithiol in glacial acetic acid containing hydrogen chloride gas, and by then refluxing the 3-thioketal steroid that is formed with an excess of Raney nickel in anhydrous ethanol.

The starting materials for the preparation of the novel steroids of the present invention are known or can be prepared from known steroids. Thus, the 1,2-methylene pregnanes and 19-norpregnanes can be prepared from 3-keto-$5\alpha$-steroids by allowing them to react with bromine in acetic acid in the presence of an acid catalyst. The resulting 2-bromo-3-keto-$5\alpha$-steroid is heated with calcium carbonate in a suitable organic base, such as dimethyl acetamide to yield the 3-keto-$\Delta^1$-ene steroid. This steroid can be treated with diazomethane in ether to yield the 1,2-pyrazoline which is converted into 1,2-methylene upon pyrolysis. Both the $1\alpha,2\alpha$- and $1\beta,2\beta$-methylene steroid isomers are formed and are separated by conventional techniques, such as fractional crystallization, chromatography, and so forth. By treating the 3-keto-$\Delta^1$-ene steroids with an excess of sodium chlorodifluoroacetate in dimethyl diethyleneglycol, the corresponding 3-keto-$1\alpha,2\alpha$-difluoromethylene steroids are formed. By the same procedure, the 3-keto-$1\alpha,2\alpha$-dichloromethylene steroids can be synthesized by replacing sodium chlorodifluoroacetate with sodium trichloroacetate. Under this procedure, free hydroxy groups will be esterified, but by a mild alkaline saponification the free hydroxy groups may be regenerated.

The $1\alpha,2\alpha$-substituted-3-keto steroids can be converted into the $1\alpha,2\alpha$-substituted-3-keto-$\Delta^4$-ene steroids by the conventional methods. For example, by treating the former with an equivalent amount of bromine in the presence of p-toluenesulfonic acid in glacial acetic acid, the $1\alpha,2\alpha$-substituted-3-keto-4-bromo steroid is formed which yields the $\Delta^4$-steroid upon debromination with calcium carbonate in dimethyl acetamide.

The 3-keto-$6\beta$-chloro-$\Delta^4$-ene steroids can be prepared from the corresponding 3-ethoxy-$\Delta^{3,5}$-diene steroid (which is made by treating the 3-keto-$\Delta^4$-ene steroid with ethyl orthoformate in the presence of p-toluenesulfonic acid) by allowing it to react with an equivalent molar amount of N-chloro-succinimide in the presence of acetic acid in an acetone solvent. The $6\alpha$-chloro steroid is produced by treating the $6\beta$-chloro steroid in glacial acetic acid with anhydrous hydrogen chloride gas at 15° C. By treating the 3-ethoxy-$\Delta^{3,5}$-diene steroids with perchloryl fluoride in dimethyl formamide at 0° C., the corresponding 3-keto-$6\beta$-fluoro-$\Delta^4$-ene steroid is formed. Subjecting this steroid to hydrogen chloride gas in glacial acetic acid converts it to the 3-keto-$6\alpha$-fluoro-$\Delta^4$-ene steroid.

Refluxing the 3-keto-$\Delta^4$-ene steroid in t-butanol and chloranil, yields the corresponding 3-keto-$\Delta^{4,6}$-diene steroid. Alternatively, 3-keto-$\Delta^{4,6}$-diene steroids are converted into the corresponding 3-keto-$\Delta^{1,4,6}$-triene steroids via the action of chloranil in n-amyl alcohol.

The 20-keto group is redduced to a hydroxy group by treatment with lithium aluminum tri(t-butoxy) hydride in tetrahydrofuran. This treatment also reduces the 3-keto group, which is selectively oxidized with manganese dioxide in chloroform at room temperature.

The 16-methyl-$\Delta^{15}$-ene steroid starting materials of the present invention are produced by treating 3,20-diketo-$17\alpha$-hydroxy pregnanes and 19-norpregnanes with semicarbazide to produce the 3,20-bis-semicarbazone steroid. After esterification with acetic anhydride, the 3,20-bis-semicarbazone-$17\alpha$-acetoxy steroid is allowed to react with an aqueous solution of pyruvic acid to yield the 3,20-diketo-$\Delta^{16}$ compound. This $\Delta^{16}$-ene steroid is then caused to react with diazomethane, and the 16,17-pyrazoline that is formed is pyrolized to produce the 16-methyl-$\Delta^{16}$-ene steroid. Treating of this with hydrogen peroxide in the presence of base yields the 16-methyl-16,17-oxido steroid which is converted into a mixture of 16-methyl-$17\alpha$-hydroxy-$\Delta^{15}$-ene and 16-methylene-$17\alpha$-hydroxy steroids with hydrobromic acid in acetic acid. The two forms are separated by conventional techniques, such as crystallization, chromatography, etc.

The following examples will further illustrate the present invention but are in no way intended to limit its scope.

PREPARATION 1

To a stirred and refluxing solution of 1 g. of $17\alpha$-hydroxy-$5\alpha$-pregn-1-ene-3,20-dione in 8 ml. of dimethyl diethyleneglycol ether is added in a dropwise fashion over a 2-hour period, a solution of 30 equivalents of sodium chlorodifluoroacetate in 30 ml. of dimethyl diethyleneglycol ether. At the end of the reaction period, which may be followed by the U.V. spectra, the mixture is filtered and evaporated in vacuo to dryness. The residue is added to 10% methanolic potassium hydroxide, and this mixture is heated briefly at reflux and poured into ice water. The solid which forms is collected, washed with water, dried and chromatographed on alumina, eluting with methylene chloride, to yield 1α,2α-difluoromethylene-17α-hydroxy-5α-pregnane-3,20-dione.

17α-hydroxy-19-nor-5α-pregn-1-ene-3,20-dione is converted into 1α,2α-difluoromethylene-17α-hydroxy-19-nor-5α-pregnane-3,20-dione in a similar manner.

By treating 17α-hydroxy-5α-pregn-1-ene-3,20-dione with sodium trichloroacetate in dimethyltriethyleneglycol ether in the manner of the foregoing procedure, there is obtained 1α,2α - dichloromethylene - 17α - hydroxy-5α-pregnane-3,20-dione.

To a stirred solution of 1 g. of 1α,2α-difluoromethylene-17α - hydroxy - 5α - pregnane - 3,20-dione and 6.6 g. of p-toluenesulfonic acid in 330 ml. of glacial acetic acid is added, over a 10-minute period, a solution of 1.1 molar equivalent of bromine and 2.45 g. of sodium acetate in 110 ml. of glacial acetic acid. After stirring for an additional 10-minute period, a solution of 75 g. of sodium acetate in 150 ml. of glacial acetic acid is added and stirring is then continued at 20° C. for 5 minutes. The reaction mixture is next poured into 1 liter of ice water and the solid which forms is collected and dissolved in methylene chloride. This solution is washed with water, dilute sodium bicarbonate solution and water, dried and evaporated to dryness. The residue is dissolved in 60 ml. of dimethylformamide and added to a well stirred suspension of 12.5 g. of calcium carbonate in 440 ml. to dimethylacetamide, heated at reflux. Refluxing is continued for 45 minutes, and the mixture is then filtered and concentrated to about 60 ml. under reduced pressure. After the addition of 5 ml. of hexane, the mixture is filtered and the filtrate is evaporated to dryness. This residue is chromatographed on acid washed alumina with 3:1 benzene:chloroform to yield 1α,2α - difluoromethylene - 17α-hydroxypregn-4-ene-3,20-dione which may be recrystalized from cyclohexane:ethyl acetate.

The steroid is then treated with 1.4 g. of semicarbazide hydrochloride in 30 ml. of methanol containing 1 ml. of water and 0.74 g. of sodium bicarbonate. The mixture is refluxed for 3 hours and then maintained at 45° C. for an additional 20 hours while under a nitrogen atmosphere. Fifty milliliters of water are added, and the 3,20-bis-semicarbazone - 1α,2α-difluoromethylenepregn-4-en-17α-ol is collected by filtration. After it is vacuum dried at room temperature, it is dissolved in a solution of 20 ml. of acetic acid and 1 ml. of acetic anhydride and heated at reflux under nitrogen for 1 hour. The reaction mixture is then concentrated under reduced pressure to a volume of about 12 ml. and treated with 6 ml. of water and 3 ml. of pyruvic acid. The mixture is allowed to stand at room temperature for 40 hours and at 60° C. for 2 hours and is then diluted with water and extracted with chloroform. These extracts are washed with water, a dilute aqueous potassium bicarbonate solution and water, dried over magnesium sulfate and evaporated to dryness under reduced pressure. The resulting 1α,2α-difluoromethylenepregna-4,16-diene-3,20-dione is dissolved in 10 ml. of ether, and a 10 ml. saturated ether solution of diazomethane is cautiously added to it. The mixture is allowed to stand for 24 hours and then 1 milliliter of glacial acetic acid is slowly added. The mixture is evaporated to dryness under reduced pressure. The residue is gradually heated to 180° C. in vacuo, yielding 1α,2α-difluoromethylene - 16-methylpregna-4,16-diene-3,20-dione which is further purified by recrystallization from acetone: hexane. The steroid is then dissolved in 10 ml. of methanol, and a mixture of 4 ml. of 4 N sodium hydroxide and 4 ml. of 30% w./v. hydrogen peroxide is slowly added to the methanol solution while maintaining the temperature at around 15° C. The solution is allowed to stand at 0° C. for 24 hours and is then poured into ice water. The solid which forms is collected by filtration, washed with water and dried. The solid is recrystallized from acetone:hexane to yield 1α,2α-difluoromethylene-16β-methyl-16α,17α-oxidopregn-4-ene-3,20-dione.

The steroid is then suspended in 10 ml. of dioxane and 0.5 ml. of a 50% w./v. solution of hydrogen bromide in acetic acid is added. After being allowed to stand for 10 minutes at room temperature, the mixture is poured into water and extracted with ether. These ethereal extracts are dried over sodium sulfate and evaporated to dryness to yield 1α,2α-difluoromethylene-16-methyl-17α-hydroxypregna-4,15-diene-3,20-dione and 1α,2α-difluoromethylene - 16 - methylene-17α-hydroxypregn-4-ene-3,20-dione which are separated on an alumina column. The separated 1α,2α-difluoromethylene - 16 - methyl-17α-hydroxypregna-4,15-diene-3,20-dione is then further purified by recrystallization from acetone:hexane.

PREPARATION 2

To a suspension of 1 g. of 1α,2α-difluoromethylene-17α-hydroxypregn-4-ene-3,20-dione in 7.5 ml. of anhydrous, peroxide-free dioxane are added 1.2 ml. of freshly distilled ethyl orthoformate and 0.8 g. of p-toluenesulfonic acid. The mixture is stirred at room temperature for 30 minutes. There is then added 0.8 ml. of pyridine, followed by water until solidification occurs. This solid is collected by filtration, washed with water and air dried to yield 1α,2α - difluoromethylene-3-ethoxy-17α-hydroxypregna-3,5-diene-3,20-dione which is recrystallized from acetone:hexane. The steroid and 0.4 g. of anhydrous sodium acetate are dissolved in a mixture of 20 ml. of acetone and 32 ml. of water. The solution is cooled to 5° C. and 1.1 molar equivalents of N-chlorosuccinimide and 0.4 ml. of glacial acetic acid are added. The mixture is stirred for 30 minutes at the same temperature and then diluted with water. After being allowed to stand at 0° C. for 15 hours, the solid is collected by filtration, washed with water and dried under vacuum to yield 1α,2α-difluoromethylene-6β-chloro-17α-hydroxypregn - 4 - ene-3,20-dione which is recrystallized from acetone. The corresponding 6α-chloro compound is obtained by dissolving this compound in glacial acetic acid and introducing a slow stream of anhydrous hydrogen chloride over a period of 4 hours at a temperature of 15° C. The solid which forms upon pouring this mixture into water is collected by filtration, washed with water and dried to yield 1α,2α-difluoromethylene-6α-chloro-17α-hydroxypregn - 4 - ene-3,20-dione which is recrystallized from acetone:hexane.

1α,2α - Difluoromethylene - 6α - chloro-17α-hydroxy-19-norpregn-4-ene-3,20-dione and 1α,2α-dichloromethylene-6α-chloro-17α-hydroxypregn-4-ene-3,20-dione are produced in the same manner.

By the procedure of Preparation 1, these steroids are converted into the corresponding 16-methyl-Δ¹⁵-ene steroids.

PREPARATION 3

A stream of perchloryl fluoride is passed through a solution of 1 g. of 1α,2α-dichloro-3-ethoxy-17α-hydroxypregna-3,5-diene-20-one in 25 ml. of dimethylformamide, cooled to 0° C., for 5 minutes. After being allowed to slowly attain a temperature of 20° C., the solution is poured into water and extracted with ethyl acetate. These extracts are washed with saturated aqueous sodium bicarbonate solution and with water to neutrality, dried over sodium sulfate and evaporated to dryness. The residue is then chromatographed on alumina to separate the 6α-fluoro and 6β-fluoro isomers. The latter which predominates, is dissolved in 50 ml. of glacial acetic acid, and through this solution is passed a stream of dry hydrogen chloride for a period of 24 hours at a temperature at 15° C. The mixture is poured into cold water, and the solid which forms is collected by filtration, washed with water and dried to yield 1α,2α-dichloro-6α-fluoro-17α-hydroxypregn-4-ene-3,20-dione which is recrystallized from acetone:hexane.

By treating these steroids in the same manner as the steroids of Preparation 1, the corresponding 16-methyl-Δ$^{15}$-ene steroids are produced. For example, the semicarbazone of 1α,2α-dichloromethylene-6α-chloro-17α-hydroxypregn-4-ene-3,20-dione is converted to 1α,2α-dichloromethylene-6α-chloro - 16 - methyl-17α-hydroxypregna-4,15-diene-3,20-dione by this treatment.

PREPARATION 4

A solution containing 1 g. of 3β,17α-dihydroxy-6,16-dimethylpregna-5,15-dien-20-one in a mixture of 80 ml. of toluene and 20 ml. of cyclohexanone is dried by removing 10 ml. of solvent by distillation. A solution of 1 g. of aluminum isopropoxide in 7 ml. of anhydrous toluene is then added and the mixture is refluxed for 45 minutes. Four milliliters of acetic acid are added and the solvents are removed by steam distillation. The residue is extracted several times with ethyl acetate, and these extracts are then washed with 5% hydrochloric acid solution, water, 10% sodium carbonate solution and water to neutrality, dried over anhydrous sodium sulfate and evaporated to dryness to yield 6α,16-dimethyl-17α-hydroxypregna-4,15-diene-3,20-dione which may be further purified by recrystallization from acetone:hexane.

Example I

A mixture of 1.0 g. of zinc:copper couple (prepared according to the method of H. E. Simmons and R. D. Smith, J. Am. Chem. Soc., 81, 4256 (1959)], 2.5 g. of methylene iodide, 20 ml. of anhydrous diethyl ether, and 5 mg. of iodide is refluxed for 1 hour, and then 5 ml. of solvent are evaporated off.

The mixture is introduced into a pressure tube with 1.0 g. of 1α,2α-methylene-6α-chloro-16-methyl-17α-hydroxypregna-4,15-diene-3,20-dione. The tube is sealed and heated at 80° C. for 6 hours. The contents are diluted with 35 ml. of diethyl ether, and this mixture is washed consecutively with 5% hydrochloric acid, aqueous 5% sodium bicarbonate solution, and water to neutrality. The mixture is dried over anhydrous magnesium sulfate and then evaporated to dryness. The residue is chromatographed on alumina to yield 1α,2α;15α,16α-bismethylene-6α-chloro-16β-methyl - 17α - hydroxypregn-4-ene-3,20-dione.

Example II

Other 16-methyl-Δ$^{15}$ steroids are treated according to Example I to yield the following 16β-methyl-15α,16α-methylene steroids:

1α,2α;15α,16α-bismethylene-6α-fluoro-16β-methyl-17α-hydroxypregn-4-ene-3,20-dione;
1α,2α-dichloromethylene-15α,16α-methylene-16β-methyl-17α-hydroxypregn-4-ene-3,20-dione;
1α,2α-difluoromethylene-6α-chloro-15α,16α-methylene-16β-methyl-17α-hydroxypregn-4-ene-3,20-dione;
6α-chloro-15α,16α-methylene-16β-methyl-17α-hydroxypregn-4-ene-3,20-dione;
6α-fluoro-15α,16α-methylene-16β-methyl-17α-hydroxypregn-4-ene-3,20-dione;
6α,16β-dimethyl-15α,16α-methylene-17α-hydroxy-19-norpregn-4-ene-3,20-dione;
15α,16α-methylene-16β-methyl-17α-hydroxypregn-4-ene-3,20-dione;
15α,16α-methylene-16β-methyl-17α-hydroxy-19-norpregn-4-ene-3,20-dione;
6α-chloro-15α,16α-methylene-16β-methyl-17α-hydroxy-19-norpregn-4-ene-3,20-dione;
1α,2α;15α,16α-bismethylene-6α,16β-dimethyl-17α-hydroxypregn-4-ene-3,20-dione;
6α-fluoro-15α,16α-methylene-16β-methyl-17α-hydroxypregna-1,4-diene-3,20-dione; and so forth.

Example III

One gram of 1α,2α;15α,16α-bismethylene-6α-chloro-16β-methyl-17α-hydroxypregn-4-ene-3,20-dione and 2 g. of chloranil in 50 ml. of t-butanol are heated at reflux for 8 hours. The cooled reaction mixture is filtered and the solid thus separated is washed with a large volume of ethyl acetate. The combined filtrate and washings are in turn washed with cold 10% aqueous sodium hydroxide until the washings are colorless, dried over sodium sulfate and evaporated to dryness to yield 1α,2α;15α,16α-bismethylene - 6 - chloro-16β-methyl-17α-hydroxypregna-4,6-diene-3,20-dione which may be further purified through clarification with alumina and recrystallization from methylene chloride:ether.

By the use of this procedure the 3-keto-Δ$^4$-ene steroids of examples I and II can be converted into the corresponding 3-keto-Δ$^{4,6}$-diene steroids. For example, 6-chloro-15α,16α-methylene-16β-methyl-17α-hydroxy-19-norpregna-4,6-diene-3,20-dione;
6-fluoro-15α,16α-methylene-16β-methyl-17α-hydroxypregna-4,6-diene-3,20-dione;
6,16β-dimethyl-15α,16α-methylene-17α-hydroxypregna-4,6-diene-3,20-dione;
1α,2α-difluoromethylene-6-chloro-15α,16α-methylene-16β-methyl-17α-hydroxypregna-4,6-diene-3,20-dione;

and so forth, can be made by treatment of the corresponding 3-keto-Δ$^4$-enes.

Example IV

A mixture of 1 g. of 6-chloro-15α,16α-methylene-16β-methyl-17α-hydroxypregn-4,6-diene-3,20-dione, 1 g. of p-toluenesulfonic acid monohydrate, 50 ml. of acetic acid and 25 ml. of acetic anhydride is allowed to stand at room temperature for 24 hours, and is then poured into water and stirred. This mixture is then extracted with methylene chloride, and these extracts are dried and evaporated. The residue is added to 250 ml. of absolute methanol containing 5 cc. of concentrate hydrochloric acid; the mixture is refluxed for 1 hour under anhydrous conditions. The mixture is neutralized with an aqueous 20% potassium bicarbonate solution and is then evaporated to dryness under reduced pressure. The residue is taken up in methylene chloride. The methylene chloride solution is washed with water to neutrality, dried and evaporated to yield 6 - chloro - 15α,16α-methylene-16β-methyl-17α-acetoxypregna-4,6-diene-3,20-dione.

Likewise, the following compounds are obtained from the corresponding 17α-hydroxy compounds:

15α,16α-methylene-16β-methyl-17α-actoxypregn-4-ene-3,20-dione;
15α,16α-methylene-16β-methyl-17α-acetoxy-19-norpregn-4-ene-3,20-dione;
6α,16β-dimethyl-15α,16α-methylene-17α-acetoxypregn-4-ene-3,20-dione;
6-chloro-15α,16α-methylene-16β-methyl-17α-acetoxypregna-4,6-diene-3,20-dione;
6-chloro-15α,16α-methylene-16β-methyl-17α-acetoxy-19-norpregna-4,6-diene-3,20-dione;
6-fluoro-15α,16α-methylene-16β-methyl-17α-acetoxypregna-4,6-diene-3,20-dione;
6,16β-dimethyl-15α,16α-methylene-17α-acetoxypregna-4,6-diene-3,20-dione;
1α,2α;15α,16α-bismethylene-6-chloro-16β-methyl-17α-acetoxypregna-4,6-diene-3,20-dione;
1α,2α-difluoromethylene-6-chloro-15α,16α-methylene-16β-methyl-17α-acetoxypregna-4,6-diene-3,20-dione;
and so forth.

By subjecting the 17α-hydroxy derivatives of the above 17α-acetoxypregnanes and 19-norpregnanes to the same process and using propionic anhydride, butyric anhydride, cyclopentyl-propionic anhydride or caproic anhydride in place of acetic anhydride, the correspodinng 17α-propionic, 17α-butyric, 17α-cyclopentylpropionic, or 17α-caproic esters are formed, e.g. 6-coloro-15α,16α-methylene-16β-methyl-17α-caproxypregna-4,6-diene-3,20-dione, and so forth.

Example V

A solution of 200 mg. of 6-chloro-15α,16α-difluoromethylene-16β-methyl - 17α-acetoxypregna-4,6-diene-3,20-dione in 32 ml. of anhydrous isopropanol and 25 mg. of sodium borohydride is stirred at room temperature for 15 hours. One hundred milliliters of water are added and the resulting suspension is extracted several times with ether. The ether phase is dried over sodium sulfate and evaporated to dryness under reduced pressure to yield 3β - hydroxy - 6 - chloro-15α,16α - difluoromethylene-16β-methyl-17α-acetoxypregna-4,6-dien-20-one which may be further purified by recrystallization from ether.

By the same process the 3-keto pregnanes and 19-norpregnanes of Examples I, II, III and IV can be converted into the corresponding 3β-hydroxy pregnanes and 19-norpregnanes.

A mixture of 1 g. of 1α,2α;15α,16α-methylene-3β-hydroxy-6-chloro-16β-methyl-17α-acetoxypregn - 4,6 - dien-20-one, 4 ml. of pyridine and 2 ml. of acetic anhydride is allowed to stand at room temperature for 15 hours. The mixture is then poured into ice water and the solid which forms is collected by filtration, washed with water and dried to yield 1α,2α;15α,16α-bismethylene-3β,17α-diacetoxy-6-chloro-16β-methylpregna-4,6-dien - 20 - one which may be further purified through recrystallization from acetone: hexane.

Likewise, 3β,17α-diacetoxy-6-chloro-15α,16α-methylene-16β-methylpregna-4,6-dien-20 - one; 3β-17α-diacetoxy-6α,16β-dimethyl-15α,16α-methylpregn-4-en-20-one; 3β,17α-diacetoxy-15α-,16α-methylpregn-4-en-20-one and the like can be produced by the same process from the corresponding 3β-hydroxy steroid.

By the same process, but replacing acetic anhydride with caproic anhydride, the 3β-caproxy esters of the above compounds can be synthesized, e.g. 3β-caproxy-6-chloro-15α,16α - methylene - 16β - methyl-17α-acetoxypregn-4,6-dien-20-one.

Example VI

Two milliliters of dihydropyran are added to a solution of 1 g. of 3β-hydroxy-6-chloro-15α,16α-methylene-16β-methyl-17α-acetoxypregna-4,6-dien-20-one in 15 ml. of benzene. About 1 ml. is removed by distillation to remove moisture and 0.4 g. of p-toluenesulfonyl chloride is added to the cooled solution. This mixture is allowed to stand at room temperature for 4 days and is then washed with aqueous sodium carbonate solution and water, dried and evaporated. The residue is chromatographed on neutral alumina, eluted with hexane, to yield 3β-(tetrahydropyran-2-yloxy)-6-chloro - 15α,16α - methylene-16β-methyl-17α-acetoxypregna-4,6-dien-20-one which is recrystallized from pentane.

In a similar fashion, the 3β-hydroxy compounds of Example VI can be generated into the corresponding 3β-tetrahydropyran-2-yl ethers.

By using the same method but utilizing dihydrofuran instead of dihydropyran, the 3β-tetrahydrofuran-2-yl ethers of the above 3β-hydroxy compounds can be produced. Thus, from 3β-hydroxy-6-chloro-15α,16α-methylene-16β-methyl - 17α - acetoxypregna-4,6-dien-20-one; 3β-(tetrahydrofuran-2-yloxy)-6-chloro - 15α,16α - methylene-16β-methyl - 17α - acetoxypregna-4,6-dien-20-one can be synthesized.

Example VII

A solution of 5 g. of 6-chloro-15α,16α-methylene-16β-methyl-17α-acetoxypregna-4,6-diene-3,20-dione in 100 ml. of glacial acetic acid, containing 5 ml. of ethane dithiol and 4 ml. of a saturated solution of hydrogen chloride in acetic acid, is allowed to stand at room temperature for 4 hours. Water is added and the resulting mixture is then extracted with ethyl acetate. The extracts are washed with a 5% aqueous sodium bicarbonate solution and water, dried over sodium sulfate and evaporated to dryness. The residue is recrystallized from ether:hexane and 4 g. of this material is suspended in 3 liters of ethanol (previously distilled over Raney nickel) and heated to reflux with 50 g. of Raney nickel for 6 hours. The metal is removed by filtration and washed with hot ethanol and the filtrate is evaporated to dryness. The residue is dissolved in chloroform and this chloroform solution is washed with dilute hydrochloric acid, sodium carbonate solution and water respectively, dried and evaporated to dryness to yield 6-chloro-15α,16α-methylene-16β-methyl-17α-acetoxypregna-4,6-dien-20-one which may be further purified by recrystallization from acetone:hexane.

Similarly, 6,16β-dimethyl - 15α,16α - methylene-17α acetoxypregna-4,6-dien-20-one can be produced by treating the corresponding 3-keto steroid to the same process.

Example VIII

Eighteen hundred mg. of cupric acetate are suspended in 100 ml. of glacial acetic acid and the mixture is heated to 85° C. 30 gm. of zinc powder and 100 ml. of glacial acetic acid are added and the mixture is stirred while the temperature is maintained at 85° C. for 10 minutes. The liquid is decanted off the solid and the solid is washed with several portions of glacial acetic acid and at least 7 portions of anhydrous ethyl ether each time the liquid is decanted off the solid. The solid is the zinc:copper couple comprising of 98% zinc and 2% copper.

Thirty grams of the zinc:copper couple (450 mmoles of zinc) are suspended in 200 ml. of anhydrous diethyl ether and mixture is gently refluxed. 7.0 gm. of methylene iodide (26 mmoles) are added and once a reaction between the zinc:copper couple and the methylene iodide begins a solution comprising of 5 gm. of 16-methyl-17α-hydroxyprengna - 4,15 - diene-3,20-dione (14.4 mmoles), 83.0 gm. of methylene iodide (310 mmoles) and 200 ml. of anhydrous diethyl ether is slowly added to the initial mixture at such a rate so as to permit the reaction to generate enough heat to distill off some of the ether. The volume of ether distilled off is about equal to the volume of the solution added. After the solution has been added to the mixture, the distillation is discontinued and the mixture is refluxed for 12 hours. The resulting mixture is cooled and 200 ml. of a saturated sodium chloride solution are added. The solid that drops out is filtered off the mixture and washed well with an aqueous 3% hydrochloric acid solution. The solid then is dissolved in methylene chloride, washed with water to neutrality, dried and evaporated to dryness to yield 15α,16α-methylene-16β-methyl-17α-hydroxypregn-4-ene-3,20-dione which is recrystallized from hexane.

Example IX

A solution of 5 g. of 16-methyl-17α-hydroxypregna-4,15-diene-3,20-dione in 20 ml. of anhydrous tetrahydrofuran is cooled to 75° C. in a dry ice-acetone bath and treated with a previously cooled solution of 0.8 g. of lithium aluminum t-butoxide in 20 ml. of anhydrous tetrahydrofuran. After maintaining the reaction mixture at 75° C. for 1 hour and at room temperature for 30 minutes it is poured into ice water and extracted several times with ethyl acetate. These extracts are washed with water to neutrality, dried over anhydrous sodium sulfate and evaporated to dryness under vacuum. The residue is chromatographed and recrystallized from acetone:hexane to yield 3,17α,20-trihydroxy-16-methylpregna-5,15-diene.

The purified product is then added to a stirred suspension of 25 gm. of manganese dioxide in 500 ml. of anhydrous chloroform. After 3 hours of stirring at room temperature, the mixture is filtered, and the filtrate is washed with aqueous 3% hydrochloric acid and with water to neutrality, dried, evaporated to dryness to yield 16-methyl - 17α,20 - dihydroxypregna-4,15-dien-3-one. By the process of Example VIII this is converted into 15α, 16α-methylene-16β-methyl - 17α,20 - dihydroxypregn-4-en-3-one.

The above product is added to 100 ml. of pyridine and the resulting mixture is added to a mixture of 5 g. of chromic trioxide. The reaction mixture is allowed to stand at room temperature for 15 hours, diluted with ethyl acetate and filtered through Celite diatomaceous earth. The filtrate is washed well with water, dried and evaporated to dryness to yield 15α,16α-methylene-16β-methyl-17α-hydroxypregn-4-ene-3,20-dione which may be further purified by recrystallization from acetone:hexane. By the method of Example VIII 6 chloro-16-methyl-17α-hydroxypregn-4,6,15-triene-3,20-dione is converted into 6 chloro-15α,16α-methylene-16β-methyl - 17α - hydroxyprenga-4,6-diene-3,20-dione.

What is claimed is:
1. Compounds of the general formula:

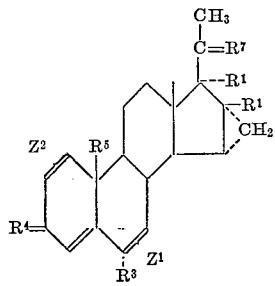

wherein,
$Z^1$ is a carbon-carbon single bond or a carbon-carbon double bond;
$Z^2$ is a carbon-carbon single bond, a carbon-carbon double bond or a methylene group bridging the 1α and 2α positions of the structure

wherein X is hydrogen, fluoro or chloro;
$R^1$ is hydroxy, a hydrocarbon carboxylic acyloxy group of less than 12 carbon atoms, tetrahydrofuran-2-yloxy or tetrahydropyan-2-yloxy;
each of $R^2$ and $R^5$ is hydrogen or methyl; $R^5$ being methyl when $Z^2$ is a carbon-carbon double bond;
$R^3$ is hydrogen, methyl, chloro or fluoro, $R^3$ being 6α when $Z^1$ is a carbon-carbon single bond;
$R^4$ is keto-oxygen or the group

in which $R^6$ is hydrogen, hydroxy, a hydrocarbon carboxylic acyloxy group of less than 12 carbon atoms, tetrahydrofuran-2-yloxy or tetrahydropyran-2-yloxy; and
$R^7$ is keto-oxygen or the ground

2. Compounds according to claim 1 wherein
$R^1$ is hydroxy or a hydrocarbon carboxylic acyloxy group of less than 12 carbon atoms;
$R^2$ and $R^5$ are methyl; and
$R^4$ and $R^7$ are keto-oxygen.
3. A compound according to claim 2 wherein
$R^1$ is acetoxy;
$R^3$ is hydrogen; and
$Z^1$ and $Z^2$ are carbon-carbon single bonds.
4. A compound according to claim 2 wherein
$R^1$ is acetoxy;
$R^3$ is α-methyl; and
$Z^1$ and $Z^2$ are carbon-carbon single bonds.
5. A compound according to claim 2 wherein
$R^1$ is acetoxy;
$R^3$ is α-methyl;
$Z^1$ is a carbon-carbon single bond; and
$Z^2$ is a carbon-carbon double bond.
6. A compound according to claim 2 wherein
$R^1$ is acetoxy;
$R^3$ is methyl;
$Z^1$ is a carbon-carbon double bond; and
$Z^2$ is a carbon-carbon single bond.
7. A compound according to claim 2 wherein
$R^1$ is acetoxy;
$R^3$ is fluoro;
$Z^1$ is a carbon-carbon double bond; and
$Z^2$ is at carbon-carbon single bond.
8. A compound according to claim 2 wherein
$R^1$ is acetoxy;
$R^3$ is chloro;
$Z^1$ is a carbon-carbon double bond; and
$Z^2$ is a carbon-carbon single bond.
9. A compound according to claim 2 wherein
$R^1$ is acetoxy;
$R^3$ is chloro; and
$Z^1$ and $Z^2$ are carbon-carbon double bonds.
10. A compound according to claim 2 wherein
$R^1$ is hydroxy;
$R^3$ is chloro;
$Z^1$ is a carbon-carbon double bond; and
$Z^2$ is a carbon-carbon single bond.
11. A compound according to claim 2 wherein
$R^1$ is hydroxy;
$R^3$ is chloro; and
$Z^1$ and $Z^2$ are carbon-carbon double bonds.
12. A compound according to claim 2 wherein
$R^1$ is caproxy;
$R^3$ is chloro;
$Z^1$ is a carbon-carbon double bond; and
$Z^2$ is a carbon-carbon single bond.
13. A compound according to claim 2 wherein
$R^1$ is acetoxy;
$R^3$ is chloro;
$Z^1$ is a carbon-carbon double bond; and
$Z^2$ is a difluoromethylene group.
14. A compound according to claim 2 wherein
$R^1$ is acetoxy;
$R^3$ is chloro;
$Z^1$ is a carbon-carbon double bond; and
$Z^2$ is a methylene group.
15. A compound according to claim 1 wherein
$R^1$ is acetoxy;
$R^2$ is methyl;
$R^3$ is hydrogen;
$R^4$ is keto-oxygen;
$R^5$ is hydrogen;
$Z^1$ is a carbon-carbon single bond; and
$Z^2$ is a carbon-carbon single bond.
$R^7$ is keto-oxygen.
16. A compound according to claim 1 wherein
$R^1$ is acetoxy;
$R^2$ is methyl;
$R^3$ is chloro;
$R^7$ and $R^4$ are keto-oxygen.
$R^5$ is hydrogen;
$Z^1$ is a carbon-carbon double bond; and
$Z^2$ is a carbon-carbon single bond.
17. Compounds according to claim 1 wherein
$R^1$ is acetoxy;
$R^2$ and $R^5$ are methyl;
$R^4$ is the group

and
$Z^2$ is a carbon-carbon single bond.
$R^7$ is keto-oxygen.
18. A compound according to claim 17 wherein
$R^3$ is α-methyl;
$R^6$ is hydrogen; and $Z^1$ is a carbon-carbon single bond.
19. A compound according to claim 17 wherein
$R^3$ is chloro;
$R^6$ is hydrogen; and
$Z^1$ is a carbon-carbon double bond.
20. A compound according to claim 17 wherein
$R^3$ is chloro;
$R^6$ is hydroxy; and
$Z^1$ is a carbon-carbon double bond.
21. A compound according to claim 17 wherein
$R^3$ is chloro;
$R^6$ is acetoxy; and
$Z^1$ is a carbon-carbon double bond.
22. A compound according to claim 17 wherein
$R^3$ is chloro;
$R^6$ is caproxy; and
$Z^1$ is a carbon-carbon double bond.

23. A compound according to claim 17 wherein
$R^3$ is chloro;
$R^6$ is tetrahydropyran-2-yloxy; and
$Z^1$ is a carbon-carbon double bond.

References Cited

UNITED STATES PATENTS

| | | | |
|---|---|---|---|
| 3,338,928 | 8/1967 | Beard | 260—397.4 |
| 3,354,151 | 11/1967 | Muller et al. | 260—239.55 |

LEWIS GOTTS, *Primary Examiner.*

ETHEL G. LOVE, *Assistant Examiner.*

U.S. Cl. X.R.

260—239.5, 397.4, 397.5, 999

UNITED STATES PATENT OFFICE
CERTIFICATE OF CORRECTION

Patent No. 3,438,975                               April 15, 1969

John A. Edwards

It is certified that error appears in the above identified patent and that said Letters Patent are hereby corrected as shown below:

Column 1, line 52, "$R^2$, $R^5$" should read -- $R^2$ and $R^5$ --. Column 4, line 44, "redduced" should read -- reduced --. Column 9, line 1, "6-coloro" should read -- 6-chloro --. Column 10, line 36, "hydroxyprengna" should read -- hydroxypregna --. Column 11, line 14, "hydroxyprenga" should read -- hydroxypregna --; lines 18 to 29, the formula should appear as shown below:

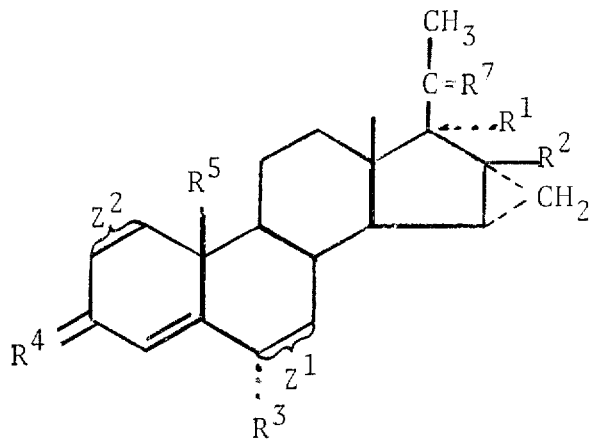

Signed and sealed this 21st day of April 1970.

(SEAL)
Attest:

EDWARD M. FLETCHER, JR.                        WILLIAM E. SCHUYLER, JR.
Attesting Officer                                      Commissioner of Patents